May 22, 1923.

F. K. ROGERS

BUMPER FOR MOTOR VEHICLES

Filed Feb. 27, 1922

1,456,281

INVENTOR.
FRANK K. ROGERS.
By O.K. Martell ATTY.

Patented May 22, 1923.

1,456,281

UNITED STATES PATENT OFFICE.

FRANK K. ROGERS, OF LOS ANGELES, CALIFORNIA.

BUMPER FOR MOTOR VEHICLES.

Application filed February 27, 1922. Serial No. 539,664.

*To all whom it may concern:*

Be it known that I, FRANK K. ROGERS, a citizen of the United States, residing at Los Angeles, in the county of Los Angeles and State of California, have invented new and useful Improvements in Bumpers for Motor Vehicles, of which the following is a specification.

My invention relates to a bumper that is particularly designed for use upon motor vehicles, the principal objects of my invention being to provide a strong and substantial bumper that is of relatively simple structure, capable of being easily and cheaply produced and having spring supported parts that will yield to a certain degree in the event that said parts strike or contact with a fixed or movable object.

A further object of my invention is to provide a bumper of neat and pleasing appearance so that when properly installed it will add materially to the appearance of the vehicle to which it is applied.

Other objects and advantages will hereinafter appear, and while I have shown and will describe the preferred form of the bumper I wish it to be understood that I do not limit myself to such preferred form, for various changes and adaptations may be made therein without departing from the spirit of my invention as set forth in the appended claim:

Figure 1:
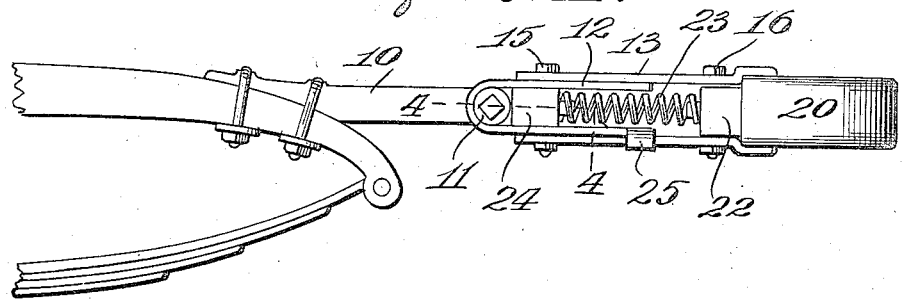
Fig. 1 is a side elevational view of my improved bumper in position upon the forward end of the frame of a vehicle.
Figure 2:
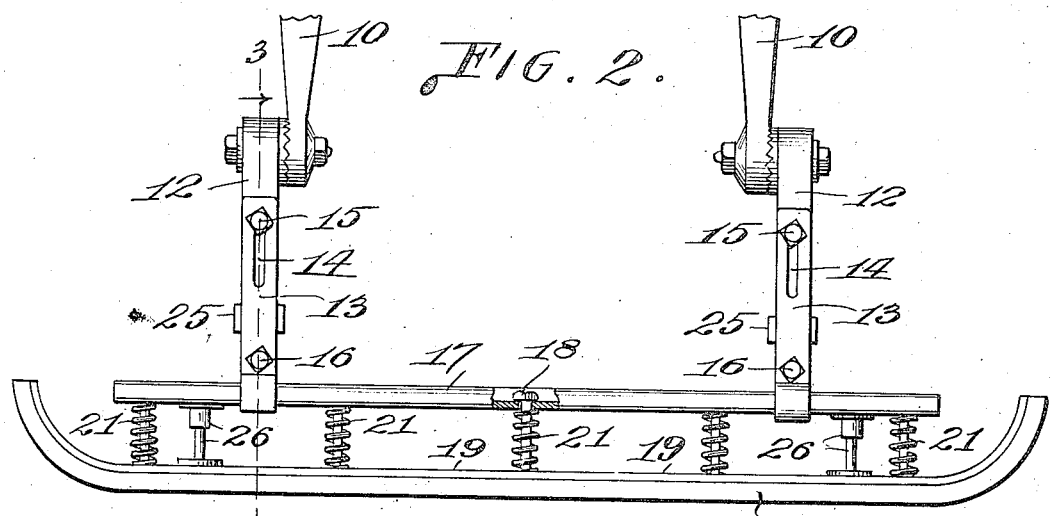
Fig. 2 is a plan view of the bumper.
Figure 3:
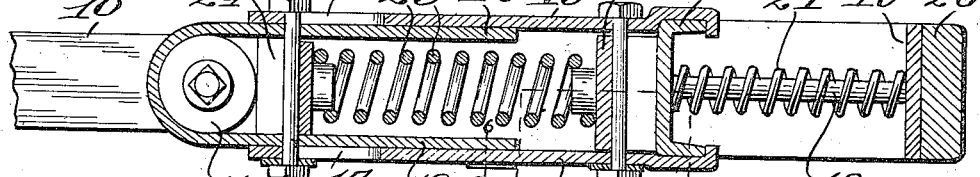
Fig. 3 is an enlarged section taken on the line 3—3 of Fig. 2.
Figures 4, 5, 6:
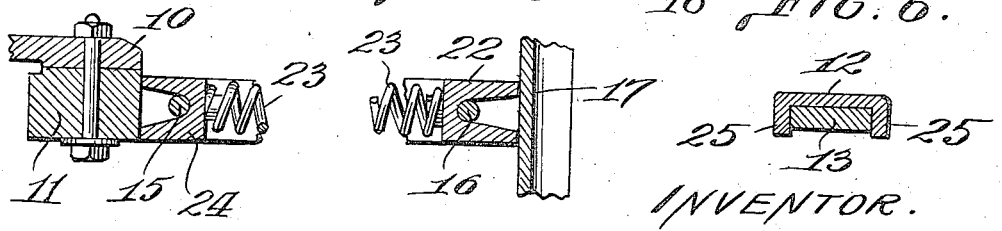
Fig. 4 is an enlarged section taken on the line 4—4 of Fig. 1.
Fig. 5 is a detail section taken on the line 5—5 of Fig. 3.
Fig. 6 is an enlarged detail section taken on the line 6—6 of Fig. 3.

Referring by numerals to the accompanying drawings which illustrate a practical embodiment of my invention 10, 10 designates horizontally disposed arms that are secured in any suitable manner to the forward ends of the frame of the vehicle.

Adjustably secured to the forward ends of these arms are cylindrical blocks 11, from each of which extends forwardly a pair of arms 12. Arranged to slide lengthwise upon each pair of said arms is a second pair of arms 13, the rear portions of which are provided with longitudinally disposed slots 14 through which pass bolts 15 that also pass through the arms 12.

Passing through the forward portions of arms 13 are bolts 16 and clamped between the forward ends of said arms is a channel bar 17.

Arranged to slide through this channel bar are the rear portions of bolts 18, the forward ends thereof being seated in a bumper rail that may be formed of wood or metal, or as shown in the drawings, of a narrow metal rail such as 19 and a wider rail 20 of wood.

Arranged on the bolts 18 and interposed between the bumper rail and channel bar 17 are compression springs 21. Blocks 22 are loosely arranged between the forward portions of arms 13 to the rear of channel bar 17, said blocks being notched or slotted for the accommodation of the bolts 16 and bearing against the rear sides of these blocks are relatively stiff coil springs 23.

The opposite ends of these springs bear against blocks 24 that are positioned between arms 12 directly in front of bolts 15.

Depending from the sides of the forward portion of the lower arms 12 are ears 25 that lie adjacent to the side edges of the lower ones of the arms 13, thereby retaining the arms in proper alignment during relative sliding movement.

In operation when the front bumper rail strikes an object, said rail will yield readily and in so doing springs 21 will be compressed and bolts 18 will slide through channel bar 17. If desired, suitable guides may be provided between the bumper rail and channel bar 17, said guides comprising pairs of telescoping members 26 that are secured to and arranged between front bumper rail and channel bar 17.

If the force of the blow received by bumper rail is such as to fully compress springs 21 and move channel bar 17 rearwardly, then arms 13 will slide lengthwise on the supporting arms 12, during which movement the relatively heavy springs 23 will be compressed. Thus it will be seen that the force of any blow received upon the front bumper rail will be yieldingly resisted, first by the springs 21 and then by the heavier springs 23 with the result that damage from collisions is reduced to a minimum.

A bumper of my improved construction is relatively simple, may be easily and cheaply produced and when properly constructed presents a neat and finished appearance.

I claim as my invention:

A vehicle bumper comprising spaced supports, telescoping members horizontally extending therefrom with interposed helical springs, means consisting of engaged serrated surfaces for maintaining said members in variable angular relation to said supports, a transverse bar connecting said members, and a variably spaced bumper rail horizontally attached to said bar with a plurality of interposed helical springs.

FRANK K. ROGERS.